United States Patent
Shimizu et al.

(10) Patent No.: US 9,218,317 B2
(45) Date of Patent: Dec. 22, 2015

(54) PARALLELIZATION METHOD, SYSTEM, AND PROGRAM

(71) Applicant: International Business Machines Corporation, Armonk, NY (US)

(72) Inventors: Shuhichi Shimizu, Tokyo (JP); Takeo Yoshizawa, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 329 days.

(21) Appl. No.: 13/972,226

(22) Filed: Aug. 21, 2013

(65) Prior Publication Data
US 2014/0047421 A1    Feb. 13, 2014

Related U.S. Application Data

(63) Continuation of application No. 13/952,077, filed on Jul. 26, 2013.

(30) Foreign Application Priority Data

Aug. 7, 2012  (JP) .................................. 2012-174491

(51) Int. Cl.
*G06F 17/12*  (2006.01)
*G06F 9/45*  (2006.01)
*G06F 17/13*  (2006.01)

(52) U.S. Cl.
CPC ................ *G06F 17/12* (2013.01); *G06F 8/451* (2013.01); *G06F 17/13* (2013.01)

(58) Field of Classification Search
CPC .................................. G06F 17/12; G06F 17/13
See application file for complete search history.

(56) References Cited

U.S. PATENT DOCUMENTS

| 4,757,466 A | * | 7/1988 | Miyaoka | ............... G06F 9/4436 708/524 |
| 7,870,556 B2 | * | 1/2011 | Wholey, III | ........... G06F 9/5066 709/226 |
| 8,516,029 B1 | * | 8/2013 | Koutis | .................... G06F 17/12 708/446 |

(Continued)

FOREIGN PATENT DOCUMENTS

| JP | 04211858 A | 8/1992 |
| JP | 0844577 A | 2/1996 |

(Continued)

OTHER PUBLICATIONS

Hironori Kasahara, et al., "Parallel Processing of the Solution of Ordinary Differential Equations Using Static Multiprocessor Scheduling Algorithms," Information Processing Society of Japan Transaction, 28(10), Oct. 15, 1987, with English Abstract, pp. 1-14.

*Primary Examiner* — Chuong D Ngo
(74) *Attorney, Agent, or Firm* — Cantor Colburn LLP; Gail Zarick

(57) ABSTRACT

A segment including a set of blocks necessary to calculate blocks having internal states and blocks having no outputs is extracted by tracing from blocks for use in calculating inputs into the blocks having internal states and from the blocks having no outputs in the reverse direction of dependence. To newly extract segments in which blocks contained in the extracted segments are removed, a set of nodes to be temporarily removed is determined on the basis of parallelism. Segments executable independently of other segments are extracted by tracing from nodes whose child nodes are lost by removal of the nodes in the upstream direction. Segments are divided into upstream segments representing the newly extracted segments and downstream segments representing nodes temporarily removed. Upstream and downstream segments are merged so as to reduce overlapping blocks between segments such that the number of segments is reduced to the number of parallel executions.

6 Claims, 12 Drawing Sheets

(56) References Cited

U.S. PATENT DOCUMENTS

2008/0120266 A1* 5/2008 Theis .................. G06F 17/12
  706/47

FOREIGN PATENT DOCUMENTS

| | | |
|---|---|---|
| JP | 2011096107 A | 5/2011 |
| JP | 2013164657 A | 8/2013 |

* cited by examiner

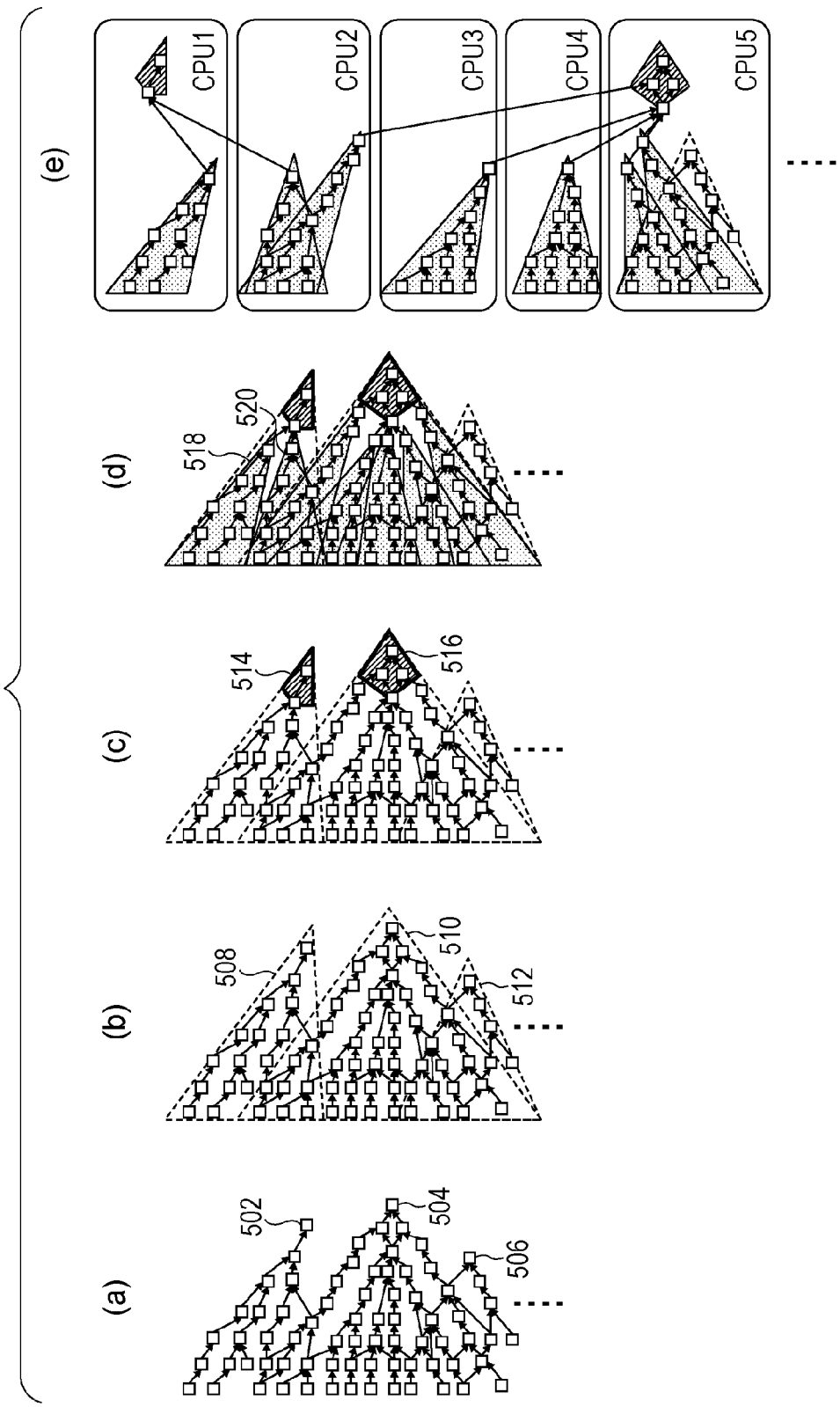

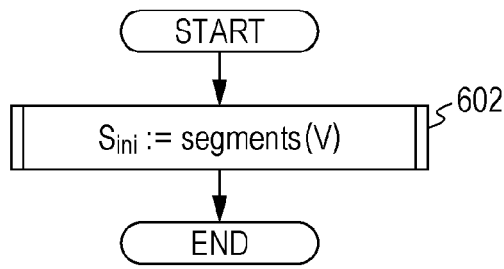
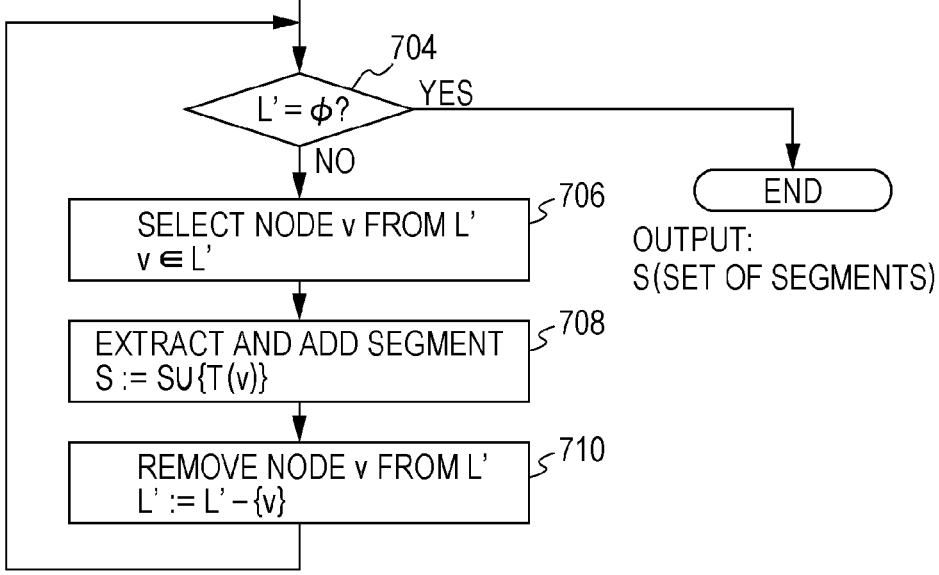

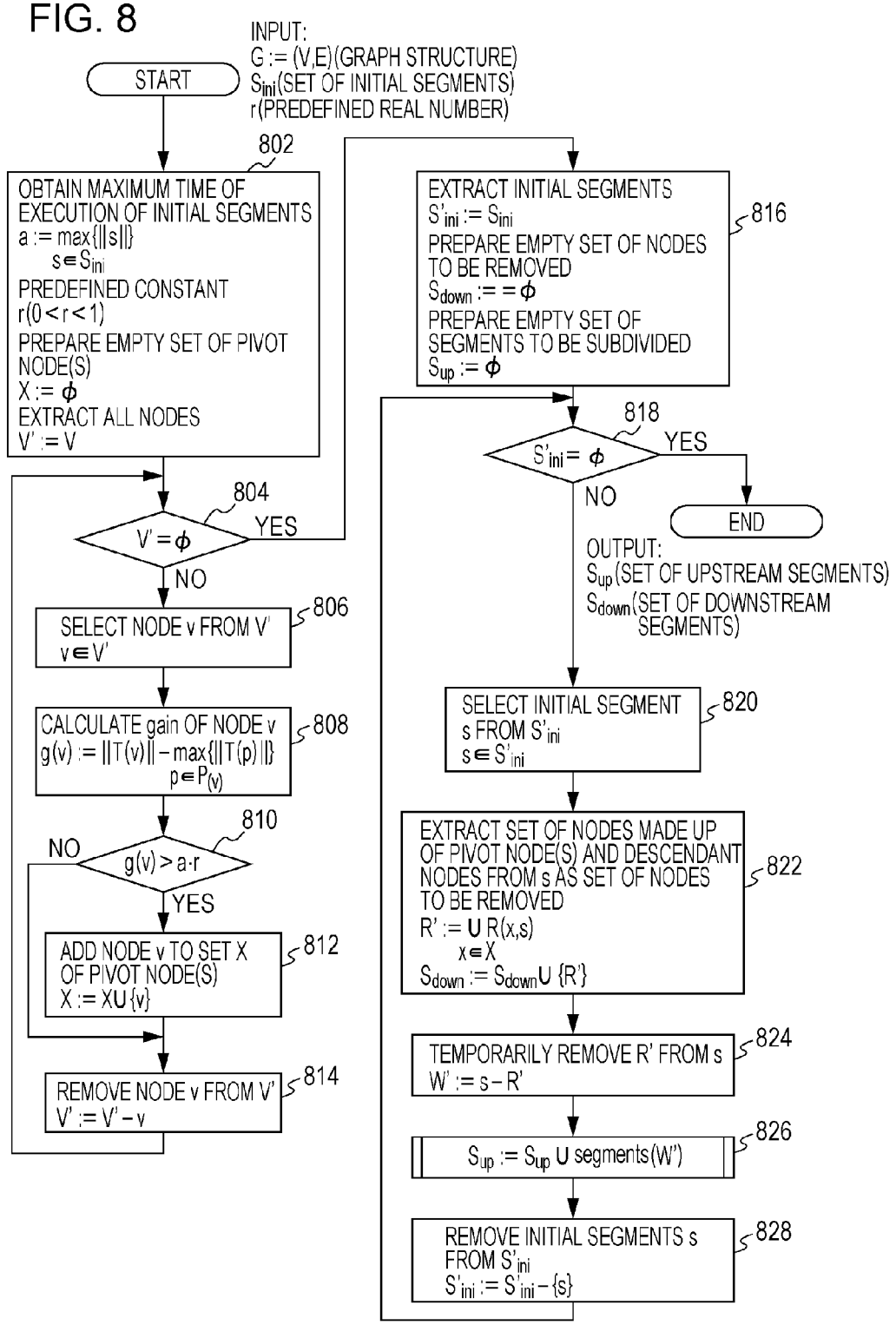

US 9,218,317 B2

PARALLELIZATION METHOD, SYSTEM, AND PROGRAM

PRIORITY

This application is a continuation of U.S. patent application Ser. No. 13/952,077, filed Jul. 26, 2013, which claims priority to Japanese Application No. 2012-174491, filed Aug. 7, 2012, and all the benefits accruing therefrom under 35 U.S.C. §119, the contents of which in its entirety are herein incorporated by reference.

BACKGROUND

The present invention relates to a technique for enhancing the speed of executing a program by parallelization in a simulation system.

In recent years, a multi-processor system, which includes a plurality of processors, is used in the fields of scientific and technological calculations, simulation, and the like. In such a system, an application program creates a plurality of processes, assigns the processes to individual processors, and causes the processors to execute the processes in parallel.

A simulation field that has been actively developed these days is simulation software for use in a mechatronics plant of robots, cars, planes, and other vehicles. By virtue of the advancement of electronic components and software technology, main part of robots, cars, planes, and other vehicles is electronically controlled using wires running like a network of neurons and a wireless local area network (LAN).

They are mechanical devices in nature, but also include large amounts of control software installed therein. To develop such products, it is necessary to expend a long time, a huge cost, and many workers in developing and testing control programs.

A known technique for conducting such a test is hardware in the loop simulation (HILS). In particular, the environment for testing electronic control units (ECU) for the overall components of a car is called a full vehicle HILS. For the full vehicle HILS, inside a laboratory, a real ECU is connected to a hardware device dedicated to emulation of an engine, a transmission mechanism, and other components, and a test is conducted under a predetermined scenario. An output of the ECU is input into a monitoring computer, and is presented on a display. A test engineer views information on the display and checks whether an anomalous operation occurs.

Unfortunately, the HILS has to use a dedicated hardware device and physically connect it to the real ECU by wiring, and its preparation is burdensome. A test after replacement with another ECU needs physical reconnection, which takes much time and effort. In addition, because the test uses a real ECU, the test requires a real time. Accordingly, conducting the test with many scenarios takes a considerable time. Typically, the hardware device for emulation in the HILS is highly expensive.

In recent years, techniques utilizing software without the use of the expensive hardware device for emulation have been developed. These techniques are called software in the loop simulation (SILS), and simulates all of the plant, including microcomputers and input and output circuits mounted on the ECU, control scenarios, an engine, and a transmission, using a software simulator. This can carry out a test without hardware of the ECU.

One example of a system that supports construction of such SILS is MATLAB®/Simulink®, which is a simulation modeling system available from The MathWork, Inc. With MATLAB®/Simulink®, a simulation program can be created by arranging functional blocks on a screen using a graphical interface and specifying a process flow with an arrow connecting them. Such a block diagram represents a process corresponding to one time step in simulation, and repeating the process a predetermined number of times can provide a behavior in a time series in a system being a target of the simulation.

In this way, when the block diagram including the functional blocks is created on MATLAB®/Simulink®, it can be converted by, for example, the function of Real-Time Workshop® into source code having the equivalent function in a known computer language, such as the C language. Compiling the source code in C enables simulation to be executed as the SILS in another computer system.

As a computer system including a multi-processor or a multi-core processor becomes commonplace, a technique for dividing a program described in a block diagram into groups called segments, assigning the segments to different processors or cores, and causing them to execute the segments in parallel to increase the speed of execution becomes available.

Japanese Unexamined Patent Application Publication No. 4-211858 discloses a reduction in influences of inter-processor communication on a time for executing processing in execution of divided data flow graphs using a plurality of processors. The reduction is achieved by assigning nodes of the data flow graphs so as to decrease the number of packets flowing among the processors.

Japanese Unexamined Patent Application Publication No. 8-44577 describes a data partitioning method for use in a multi-processor system including a plurality of processors that perform respective assigned tasks and a plurality of memories corresponding to the plurality of processors. The data partitioning method partitions data among the plurality of memories and includes associating each of the tasks with a variable to which the task accesses, identifying the type of the access to the variable by the task, determining an access cost of the access to the variable by the task, and allocating the variable to a memory corresponding to a processor that performs the task at which the access cost is the largest.

Japanese Unexamined Patent Application Publication No. 2011-96107 discloses a parallelization technique. In this technique, in a block diagram, when an output of a functional block having no internal state is used by a functional block A having an internal state, the functional block A is referred to as a use block for the functional block having no internal state. When an output of the functional block A having the internal state is used in calculation as an input of the functional block having no internal state, the functional block A is called a definition block for the functional block having no internal state. By visiting each functional block as a node, the number of sets of use blocks and that of sets of definition blocks are determined for each functional block on the basis of connection relationship between the functional blocks having internal states and the functional blocks having no internal states. Strands are assigned on the basis of the determined numbers. In this way, the block diagram is divided into the strands, thus parallelizing the processing.

From the viewpoint of a numerically solving technique, a model described as a block diagram can be considered to be an explicit representation of ordinary differential equations/state space form (ODE/SSF). An explicit parallel processing technique of solution of ordinary differential equations from this viewpoint is disclosed in Hironori KASAHARA, Toshihisa FUJII, Hiroki HONDA, and Seinosuke NARITA: Parallel Processing of the Solution of Ordinary Differential Equations Using Static Multiprocessor Scheduling Algorithms, Information Processing Society of Japan Transaction, 28(10), pp. 1060-1070 (Oct. 15, 1987). This parallel processing technique of solution of ordinary differential equations includes generating tasks, optimally scheduling the tasks on processors, and generating machine code using the scheduling results and can support various granularities.

SUMMARY

In one embodiment, a method is disclosed for solving simultaneous equations described as a plurality of ordinary differential equations represented as a graphical model including blocks as nodes and dependence as a link by processing performed by a computer including a plurality of processors, the method solving a graph representing a single ordinary differential equation using a dividing algorithm for the graph by the processing performed by the computer including the plurality of processors. The method includes forming initial segments by extracting sets of the blocks, the sets being allowed to include overlapping blocks and executable independently of each other, for each of blocks having internal states and blocks having no outputs in the model by tracing from the blocks having internal states and blocks having no outputs in a reverse direction of the dependence; selecting, from the formed initial segments, a set of blocks contained in the initial segments on the basis of parallelism in the initial segments; extracting sets of the blocks, the sets being allowed to include overlapping blocks and executable independently of each other, for each of blocks whose child blocks are lost by removal of the selected set of blocks from a processing target by tracing from the blocks whose child blocks are lost in the reverse direction of the dependence; when the extracted segments and the segment whose internal blocks are not removed from the processing target among the initial segments are referred to as upstream segments and the sets of blocks selected and removed from the processing target are referred to as downstream segments, merging the upstream segments and merging the downstream segments so as to reduce overlapping such that a number of the upstream segments and the downstream segments is reduced to at or below a predetermined number of parallel executions; compiling each of the merged segments and converting it into executable code; and individually assigning the executable code for the segments to the plurality of processors and causing the plurality of processors to execute their respective executable code in parallel.

In another embodiment, a program product is disclosed for solving simultaneous equations described as a plurality of ordinary differential equations represented as a graphical model including blocks as nodes and dependence as a link by processing performed by a computer including a plurality of processors, the program product solving a graph representing a single ordinary differential equation using a dividing algorithm for the graph by the processing performed by the computer including the plurality of processors, the program product causing the computer to execute: forming initial segments by extracting sets of the blocks, the sets being allowed to include overlapping blocks and executable independently of each other, for each of blocks having internal states and blocks having no outputs in the model by tracing from the blocks having internal states and blocks having no outputs in a reverse direction of the dependence; selecting, from the formed initial segments, a set of blocks contained in the initial segments on the basis of parallelism in the initial segments; extracting sets of the blocks, the sets being allowed to include overlapping blocks and executable independently of each other, for each of blocks whose child blocks are lost by removal of the selected set of blocks from a processing target by tracing from the blocks whose child blocks are lost in the reverse direction of the dependence; when the extracted segments and the segment whose internal blocks are not removed from the processing target among the initial segments are referred to as upstream segments and the sets of blocks selected and removed from the processing target are referred to as downstream segments, merging the upstream segments and merging the downstream segments so as to reduce overlapping such that a number of the upstream segments and the downstream segments is reduced to at or below a predetermined number of parallel executions; compiling each of the merged segments and converting it into executable code; and individually assigning the executable code for the segments to the plurality of processors and causing the plurality of processors to execute their respective executable code in parallel.

In another embodiment, a system is disclosed for solving simultaneous equations described as a plurality of ordinary differential equations represented as a graphical model including blocks as nodes and dependence as a link by processing performed by a computer including a plurality of processors, the system solving a graph representing a single ordinary differential equation using a dividing algorithm for the graph by the processing performed by the computer including the plurality of processors. The system includes storing means; a file of the model stored in the storing means; means for forming initial segments by extracting sets of the blocks, the sets being allowed to include overlapping blocks and executable independently of each other, for each of blocks having internal states and blocks having no outputs in the model by tracing from the blocks having internal states and blocks having no outputs in a reverse direction of the dependence; means for selecting, from the formed initial segments, a set of blocks contained in the initial segments on the basis of parallelism in the initial segments; means for extracting sets of the blocks, the sets being allowed to include overlapping blocks and executable independently of each other, for each of blocks whose child blocks are lost by removal of the selected set of blocks from a processing target by tracing from the blocks whose child blocks are lost in the reverse direction of the dependence; merge means for, when the extracted segments and the segment whose internal blocks are not removed from the processing target among the initial segments are referred to as upstream segments and the sets of blocks selected and removed from the processing target are referred to as downstream segments, merging the upstream segments and merging the downstream segments so as to reduce overlapping such that a number of the upstream segments and the downstream segments is reduced to at or below a predetermined number of parallel executions; means for compiling each of the merged segments and converting it into executable code; and means for individually assigning the executable code for the segments to the plurality of processors and causing the plurality of processors to execute their respective executable code in parallel.

BRIEF DESCRIPTION OF THE SEVERAL VIEWS OF THE DRAWINGS

FIG. 5a-5e includes illustrations for describing an outline of processing according to embodiments of the present invention.

FIG. 6 is a flowchart of segment extraction.

FIG. 7 is a flowchart of a subroutine called in the segment extraction.

FIG. 8 is a flowchart of segment subdivision.

DETAILED DESCRIPTION

Figure 1:
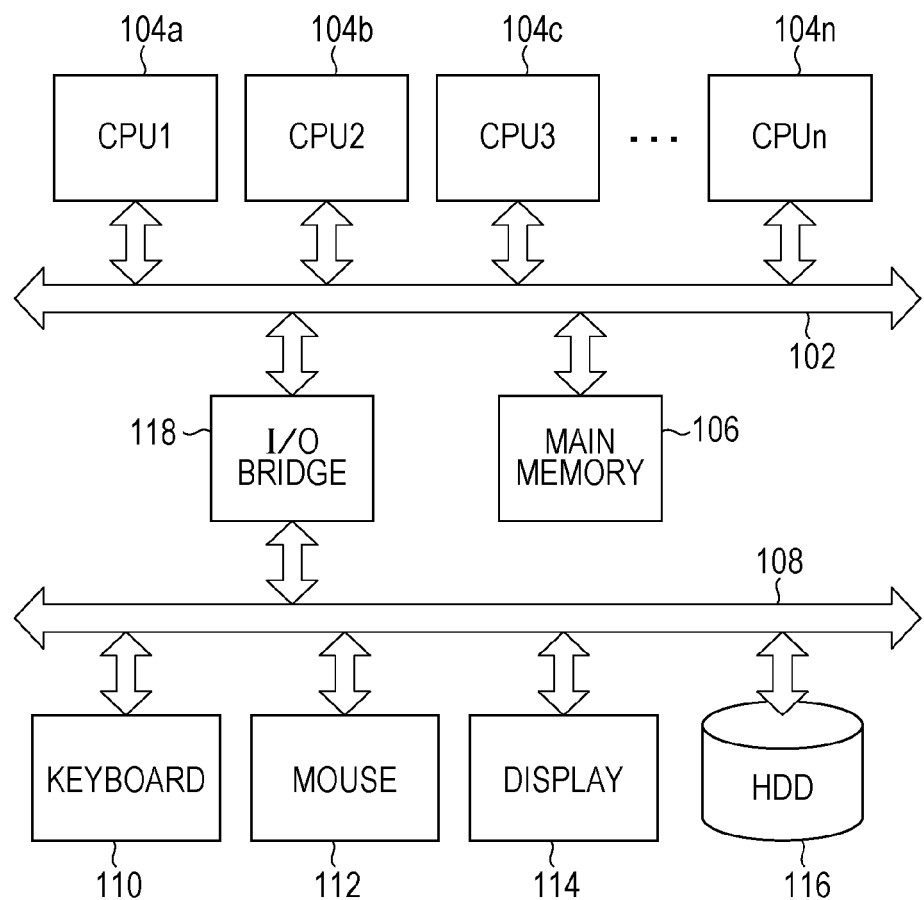
FIG. 1 is a block diagram of exemplary hardware suitable for carrying out embodiments of the present invention.

The above traditional techniques are unable to sufficiently parallelize processing described as a block diagram. The present inventors envision, in Japanese Patent Application No. 2012-26145, a technique that focuses on blocks having internal states and blocks having no outputs among functional blocks forming a block diagram describing a model. In this technique, graphs are traced from the blocks having internal states and the blocks having no outputs in the reverse direction of the dependence. Segments including blocks necessary for calculation of an input to each of the blocks having internal states and the blocks having no outputs are extracted such that the segments are allowed to include same blocks with the other segments. Then each of the segments is merged so as to reduce the number of segments to the number of parallel executions and as the number of blocks shared among different segments is reduced.

With the technique described in Japanese Patent Application No. 2012-26145, a set of blocks corresponding to calculations of the right-hand sides of simultaneous equations of ODE/SSF $x'=f(x,t)$ is referred to as a segment, where x denotes a vector of a state variable, x' denotes a vector whose elements are derivative of the elements of x, and f denotes the same number of expressions as the number of the elements of x, and execution speed can be increased by extraction of parallelism between the segments. Unfortunately, however, the segment requiring the maximum calculation time determines overall calculation time of the simulation, and the advantageous effects may be limited depending on the simulation model.

Accordingly, it is an object of the present invention to further extract parallelism in a segment, alleviate the above-described bottlenecks in the related art, and further increase processing speed.

A system according to the present invention first extracts a unit of parallel execution that does not cause communication within one step using the nature of ordinary differential equations/state space form (ODE/SSF) essentially represented by a model.

The system according to the present invention focuses on blocks having internal states and blocks having no outputs among the blocks included in a block diagram describing the model, then traces the graph from blocks that calculate inputs to the blocks having internal states and from blocks having no outputs in the reverse direction of dependence, and extracts segments including sets of blocks necessary to calculate inputs to the blocks having internal states and the blocks having no outputs. At this time, the segments are allowed to include the same blocks with the other segments.

It is desirable if the extracted segments could be divided into smaller segments executable independently of other segments, but it is impossible to subdivide them into mutually independent portions because no matter how segments are divided dependence on another portion in the segments remains. The system according to the present invention divides a segment into mutually independent sub-segments after temporarily removing some of blocks in the segment. To this end, a set of nodes to be temporarily removed is determined on the basis of parallelism in the segments.

The system according to the present invention extracts segments executable independently of other segments by tracing from nodes whose children nodes are lost by removal of the nodes in the upstream direction, and divides the segments into two groups such that the extracted segments are referred to as upstream segments and the sets of nodes temporarily removed are referred to as downstream segments.

Then the system according to the present invention merges the upstream segments and merges the downstream segments respectively so as to reduce the number of the segments in each group to the number of parallel executions. At this time, merging the segments sharing many blocks reduces the overlaps between the segments and leads to higher speed of the resulted simulation. Here, the number of parallel executions may typically be the number of usable cores or processors.

Then the system according to the present invention complies each of the resultant segments, assigns obtained executable code to cores and processors, and causes the cores or processors to execute the segments in parallel.

As described above, the present invention can provide an advantageous effect of improving execution speed. This is achieved by segmenting a program described in a graph form, such as a block diagram, in balanced segments that are independent from the others within one step, then by subdividing the segments further to extract more parallelism, and thus assigning the segments to a plurality of processors and causing them to execute the segments in parallel.

A configuration and processing of one embodiment of the present invention will be further described below with reference to the drawings. In the following description, the same elements are referred to with the same reference numbers through the drawings unless otherwise specified. It is to be understood that the configuration and processing described herein are described as merely one embodiment and are not intended to be construed as limiting the technical scope of the present invention to this embodiment.

First, hardware of a computer used for carrying out embodiments of the present invention is described with reference to FIG. 1. In FIG. 1, a host bus 102a is connected to a plurality of central processing units CPU1 104a, CPU2 104b, CPU3 104c, ..., CPUn 104n. The host bus 102 is also connected to a main memory 106 for use in arithmetic processing performed by the CPU1 104a, CPU2 104b, CPU3 104c, ..., CPUn 104n.

An I/O bus 108 is connected to a keyboard 110, a mouse 112, a display 114, and a hard disk drive 116. The I/O bus 108 is connected to the host bus 102 through an I/O bridge 118. The keyboard 110 and mouse 112 are used in an operation by an operator, such as typing a command or clicking on a menu. The display 114 is used in displaying a menu for use in operating a program according to the present invention described below through graphical user interface (GUI) as needed.

A suitable example of hardware of a computer system used for this purpose can be IBM® System X. In that case, an example of each of the CPU1 104a, CPU2 104b, CPU3 104c, . . . , CPUn 104n can be Intel® Xeon®, and an example of the operating system can be Windows™ Server 2003. The operating system is stored in the hard disk drive 116, and it is read from the hard disk drive 116 to the main memory 106 at the time of start-up of the computer system.

It is necessary to use a multi-processor system to carry out embodiments of the present invention. Here, the multi-processor system is typically intended as a system having a plurality of processor functions capable of independently performing arithmetic processing. Thus it is to be understood that the multi-processor system may be any one of a multi-core single-processor system, a single-core multi-processor system, and a multi-core multi-processor system.

A suitable example of the multi-core processor can be a processor in the Intel® Core™ series, such as Intel® Core™ 2 Quad.

The hardware of the computer system usable for carrying out the present invention is not limited to IBM® System X and may be any computer system, including a personal computer, that can run a simulation program of the present invention. The operating system is also not limited to Windows® and may be any operating system, including Linux®, Mac OS®. Moreover, a computer system enabling the simulation program to run at high speed, such as POWER™ 6-base IBM® System P, which uses the AIX™ operating system, may also be used.

The hard disk drive 116 further stores MATLAB®/Simulink® as a simulation modeling tool 202, a main routine 206, a segment extraction routine 208, a segment subdivision routine 212, a merging routine 216, a code conversion routine 220, and a C compiler or C++ compiler 224. These tool and routines are executed by being loaded on the main memory 106 in response to an operation on the keyboard 110 or mouse 112 by an operator. These tool and routines are described below with reference to FIG. 2. The main routine 206, segment extraction routine 208, segment subdivision routine 212, and merging routine 216, and other routines can be described as existing computer programming code, such as Java®, C, C++, C#, and can be created by compiling performed by a predetermined compiler.

The usable simulation modeling tool 202 is not limited to MATLAB®/Simulink® and may be any simulation modeling tool, such as open-source Scilab/Scicos.

Alternatively, depending on the case, source code of the simulation system can be directly described with C, C++, or other language without the use of the simulation modeling tool. The present invention is also applicable to such a case where functions can be described as individual functional blocks having dependence on each other.

Figure 2:
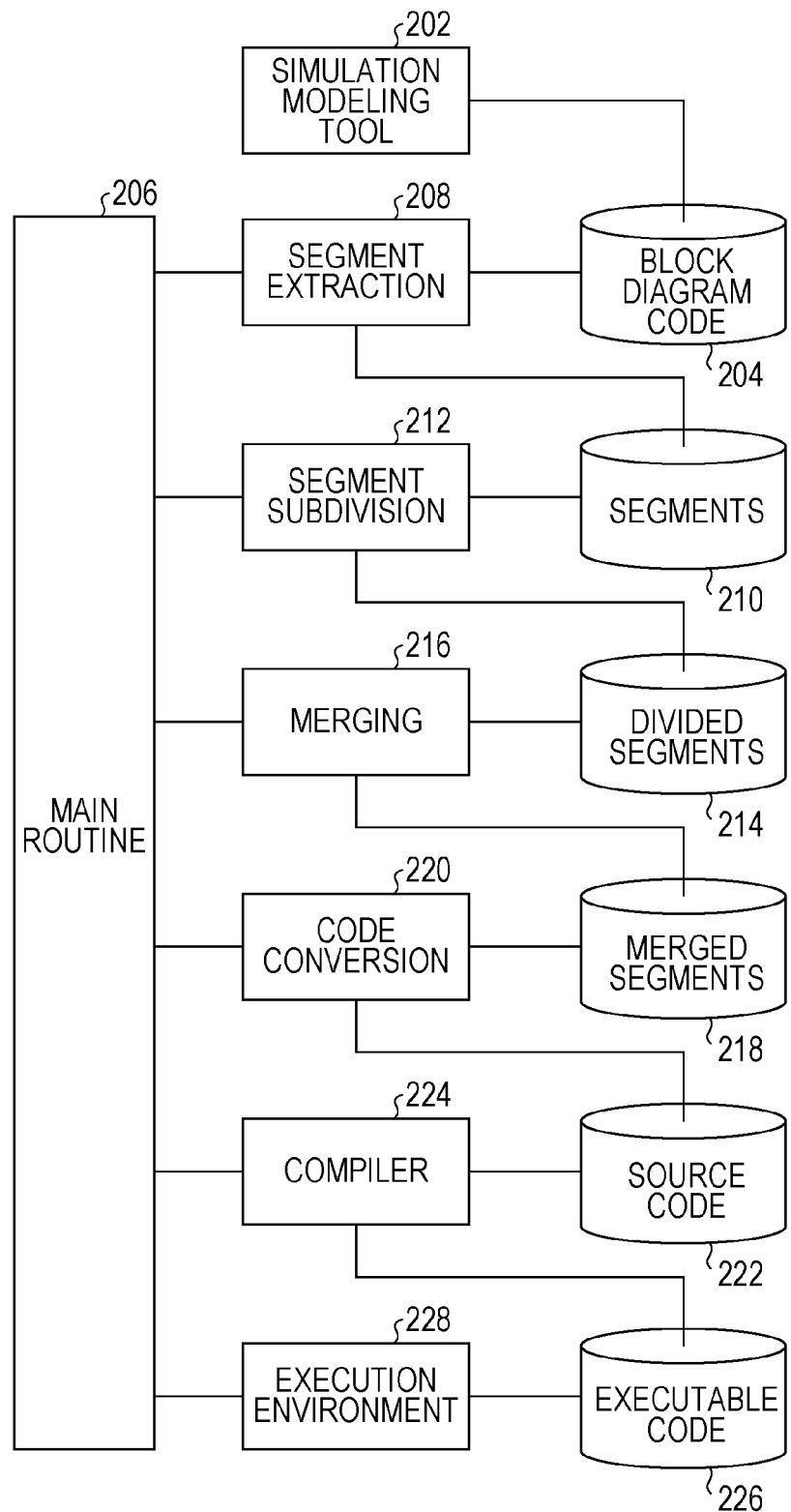
FIG. 2 is a block diagram of a functional configuration for carrying out embodiments of the present invention.
Figure 3:
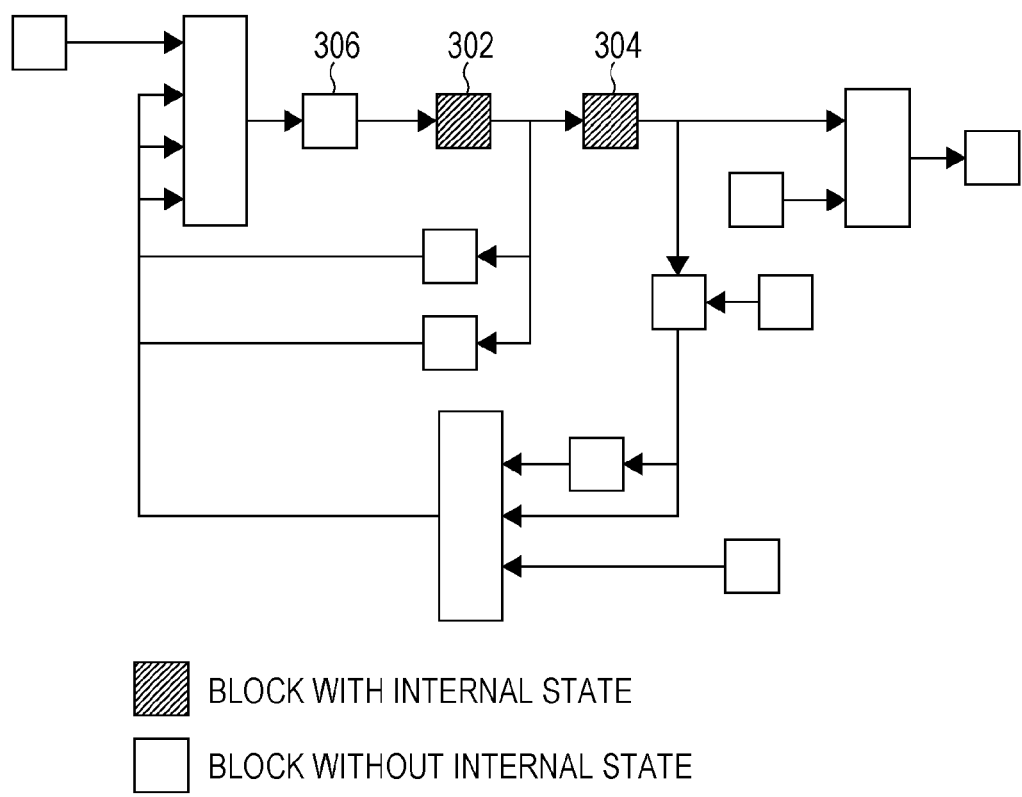
FIG. 3 is an illustration for describing a block diagram that represents inputs according to embodiments of the present invention.

FIG. 2 shows processing elements according to an embodiment of the present invention. In FIG. 2, block diagram code 204 created by an operator operating the simulation modeling tool 202 is stored in the hard disk drive 116. The block diagram code 204 may be described in, for example, a graph form in which blocks having functions are nodes and dependence between the blocks is a link, as illustrated in FIG. 3. The dependence may preferably be described in an XML form.

The main routine 206 has the function of receiving an operation on the keyboard 110 or mouse 112 by an operator, calling the segment extraction routine 208, segment subdivision routine 212, merging routine 216, code conversion routine 220, compiler 224, and other routines as appropriate, and integrating the overall processing.

The segment extraction routine 208 has the function of focusing on blocks having internal states and block having no outputs in the block diagram code 204, dividing a group of functional blocks in the block diagram into a plurality of segments such that the segments are allowed to include overlapping blocks, and writing them as a file 210 on the hard disk drive 116. Processing in the segment extraction routine 208 is described in detail below with reference to the flowcharts in FIGS. 6 and 7.

The segment subdivision routine 212 has the function of reading the segments from the file 210 and specifying a set of nodes to be temporarily removed on the basis of parallelism in each segment. The segment subdivision routine 212 extracts segments executable independently of other segments by tracing a node whose child node is lost by removal of nodes in an upstream direction, divides the segments into two groups such that the extracted segments are referred to as upstream segments and the sets of nodes temporarily removed are referred to as downstream segments, and writes the divided segments as a file 214 on the hard disk drive 116. To distinguish between the segments extracted by the segment extraction routine 208 and the segments subdivided by the segment subdivision routine 212, the former extracted segments are referred to as initial segments as appropriate, and the latter subdivided segments are referred to as upstream segments or downstream segments depending on the type. Processing in the segment subdivision routine 212 is described in detail below with reference to the flowchart in FIG. 8.

The merging routine 216 has the function of reducing overlapping blocks, forming segments by merging the upstream segments and merging downstream segments respectively, and writing them as a file 218 on the hard disk drive 116. Processing in the merging routine 216 is described in detail with reference to the flowcharts in FIGS. 9 to 13.

The code conversion routine 220 has the function of converting code described in the block diagram into, for example, source code of the C language. Source code 222 acquired by conversion for each segment may preferably be written on the hard disk drive 116. Examples of the code conversion routine 220 are not limited to but may include Realtime Workshop available from The MathWorks, Inc.

The compiler 224 compiles the source code 222 for each segment, creates executable code 226, and may preferably write it on the hard disk drive 116. The compiler 224 may be any complier that can create code applicable to the CPU1, CPU2, CPU3, . . . , CPUn.

An execution environment 228 has the function of individually assigning the executable code 226 for the segments to the CPU1, CPU2, CPU3, . . . , CPUn and causing them to execute their respective executable code in parallel.

FIG. 3 illustrates an example of a block diagram that represents inputs in embodiments of the present invention. The block diagram handled by the present invention illustrates processing for one time step of simulation, and repeating this processing a predetermined number of times can provide a behavior of the system on the time series.

More specifically, the processing for one time step of a simulation consists of the following two types of calculations. (Depending on the solver, following calculations may be repeated multiple times for one time step. The present invention is applicable to both cases.)

1) Outputs from all blocks are calculated under the following rules.

a) Because a block having an internal state does not need an input into the block and an output of this block can be calculated from its internal state, the output may be calculated at any timing. When blocks 302 and 304 illustrated in FIG. 3 are the blocks having internal states, calculation of outputs can start from these blocks.

b) Because an output of a block having no internal state is calculated on the basis of an input into the block, the output of this block is calculated after the calculation of the input into this block that is an output of its upstream block. Outputs of the blocks other than the blocks 302 and 304 in FIG. 3 can be calculated only after the inputs into them are calculated, except for a block having no input. For the block having no input, calculation of an output may start from this block.

2) Internal states of blocks are updated for the next time step by using inputs to the blocks. Because input values to the blocks having internal states (outputs of the blocks 306 and 302 in FIG. 3) are calculated by the above-described calculation, all necessary inputs to update the internal states are available.

Here, the input into each of the blocks having internal states can be considered to be nonexistent at the stage of calculating the outputs of the blocks for one time step and therefore it is called non-direct feedthrough (NDF) input. In FIG. 3, the inputs into the blocks 302 and 304 are NDF inputs. The input into the block 302 is the output of the block 306, and the input into the block 304 is the output of the block 302.

Examples of the blocks capable of having NDF inputs in Siumlink® are not limited to but may include the following elements.

Integrator: Block for integration calculation

DiscreteFilter: Block achieving an infinite impulse response (IIR) filter and a finite impulse response (FIR) filter TransferFunction: Block representing a transfer function (NDF corresponds to dx/dt)

S-function: Block whose function can be freely defined by a user

RateTransition: Block indicating that a sample time varies

Figure 4:
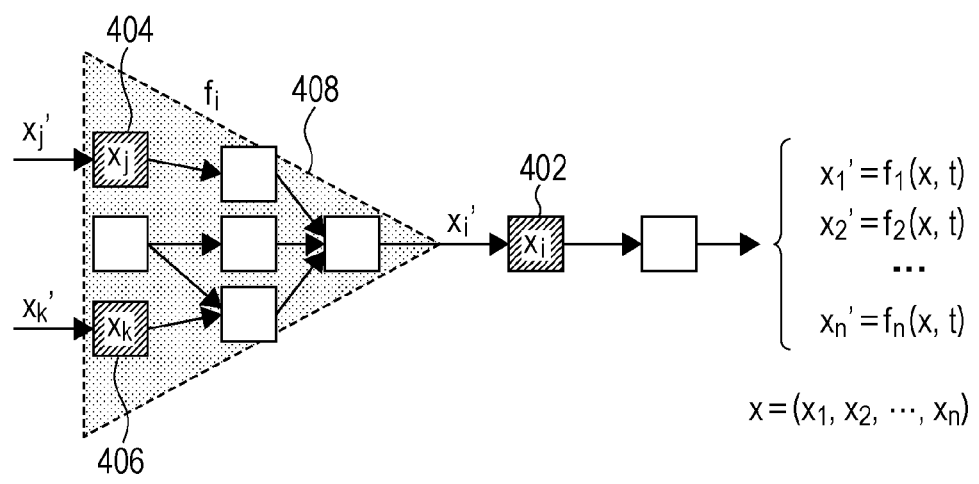
FIG. 4 is an illustration for describing a concept used by processing according to embodiments of the present invention to extract a segment.

The block diagram illustrated in the above-described manner may preferably represent the ordinary differential equations/state space form (ODE/SSF) provided in the right part in FIG. 4.

These ordinary differential equations are simultaneous equations that include variables x' required to update state variables in the left-hand sides and functions having state variables x as inputs in the right-hand sides. Typically, the variables x' correspond to time derivatives of state variables x, but they are generalized and referred to as variables required to update state variables because there are variables corresponding to the left-hand sides other than the derivatives of state variables in Simulink® and other software.

A typical procedure for numerically solving these ordinary differential equations is evaluating all the right-hand sides from state variables provided in a certain time step, acquiring values in the left-hand sides, and calculating state variables in the next time step on the basis of the values in the left-hand sides. This process is exactly the same with the above-described one for block diagrams.

FIG. 4 illustrates correspondence between this ODE/SSF and (part of) a block diagram. In FIG. 4, the blocks having internal states are blocks 402, 404, and 406.

Here, when the block 402 is of interest, its internal state (that is, a state variable in state space form) is referred to as $x_i$.

A variable $x_i'$ required to update that internal state (state variable) corresponds to an input into the block 402. A set of blocks required to calculate the value of $x_i'$ (blocks surrounded by a triangle 408) corresponds to a right-hand side $f_i$.

Here, it is to be noted that calculation of the value of $x_i'$ in a certain time step does not need $x_j'$ and $x_k'$ required to update other state variables, that is, does not need NDF inputs. It also means that the blocks for calculating $x_j'$ and $x_k'$ are not necessary to calculate $x_i'$. That is why such blocks are not included in the set of block surrounded by the triangle 408.

In the equations in the right part in FIG. 4, all the right-hand side functions can be calculated independently of each other, that is, in parallel. This nature is applied to parallelization of calculation in a block diagram in the technique described in Japanese Patent Application No. 2012-26145. This technique basically achieves speedup by executing the portions corresponding to the right-hand sides in ODE/SSF extracted from the block diagram in parallel. The present invention achieves further speedup using parallelism in each right-hand side function f.

FIG. 5 includes illustrations for describing a procedure for extracting a segment that is a unit in parallel execution from a block diagram on the basis of the above-described concept.

FIG. 5(a) illustrates a graph structure in a block diagram from which NDF inputs are removed, for convenience of the following description. Generally, when NDF inputs are removed, the graph structure is a directed acyclic graph (DAG). This graph structure represents inputs in processing in the present invention.

Here, processing in the segment extraction routine 208 traces the graphs from blocks having no child nodes (that is, the blocks correspond to blocks 502, 504, and 506 in FIG. 5(a) and are hereinafter referred to as sink blocks) in the reverse direction of dependence, that is, the reverse direction of the arrows of the links, and extracts segments including sets of blocks required to calculate the sink blocks (the segments being allowed to include overlapping blocks). The details of this processing are provided below with reference to the flowcharts in FIGS. 6 and 7.

As a result of this segmentation, as illustrated in FIG. 5(b), a segment 508 corresponding to the block 502, a segment 510 corresponding to the block 504, and a segment 512 corresponding to the block 506 are obtained. FIG. 5(b) reveals that some blocks in the segments 508 and 510 overlap each other, for example. The existence of such overlapping blocks enables each segment to be calculated independently of other segments, that is, in parallel. A practical block diagram with the order of 4000 blocks tends to have a significantly large number of segments of the order of 400 to 1000 at this stage, and in this state, it is impossible for normal hardware to assign the segments to individual processors and cause them to execute the segments in parallel. Even if processors whose number is much smaller than the number of segments identified here execute the segments in parallel as appropriate (that is, in a way in which segments whose number corresponds to the number of processors are executed, and a processor that has completed execution of one segment then processes the next segment), there may be too many overlaps and the processing time may be longer than that when all the blocks are processed sequentially. To address this issue, the technique described in Japanese Patent Application No. 2012-26145 merges segments so as to reduce overlapping blocks in the segments (ultimately, so as to reduce the maximum value of the time required for calculation of blocks included in each segment) such that the number of the segments is at or below the number of usable cores or processors. Then the technique assigns the merged segments to individual processors, and causes them to execute the segments in parallel. Unfortunately, however, this method does not utilize parallelism in initial segments, the initial segment that needs the longest processing time may be a bottleneck to the overall system, and this may restrict the advantageous effects.

To alleviate such a bottleneck, the initial segments extracted by processing in the segment extraction routine 208 are divided into smaller sets of blocks (the sets corresponding to segments) executable independently of each other on the basis of parallelism in each initial segment. No matter how the initial segments are divided, dependence on another portion inside the initial segments remains, and it is impossible to divide them into completely independent portions. To address this issue, part of blocks in the initial segments is temporarily removed and an independent portion is extracted from the sets of remaining blocks. As illustrated in FIG. 5(*c*), when a set 514 of blocks is temporarily removed from the initial segment 508 and a set 516 of blocks is temporarily removed from the initial segment 510, several blocks newly become sink blocks. Segments including sets of blocks required to calculate the newly produced sink blocks are extracted by tracing from the new sink blocks in the reverse direction of dependence. These segments can be executed independently of each other, that is, in parallel by being allowed to include overlapping blocks. Segments 518 and 520 illustrated in FIG. 5(*d*) indicate segments obtained by tracing from the sink blocks produced by temporarily removing the set 514 of blocks from the initial segment 508.

Here, the newly extracted segments and the initial segments that have not been subdivided (that is, from which no blocks have not been removed) are referred to as upstream segments, and the sets of blocks temporarily removed from the initial segments are referred to as downstream segments. The upstream segments are independent of each other, that is, executable in parallel, and the downstream segments are independent of each other, that is, executable in parallel. Accordingly, the segments are merged so as to reduce overlapping blocks (ultimately so as to reduce the minimum value of the time required for calculation of blocks included in each segment) such that the number of the segments is at or below the number of usable cores or processors, and the merged segments are assigned to individual processors. This state is illustrated in FIG. 5(*e*). The details of this processing are provided below with reference to the flowchart in FIG. 8.

The segments assigned to the processors at the stage of FIG. 5(*e*) are converted into source code by the code conversion routine 220, and the source code is converted into executable code by the compiler 224, and the executable code is assigned to individual cores or processors by the execution environment 228 and executed.

Before description of processing in the segment extraction routine 208 with reference to the flowchart in FIGS. 6 and 7, definitions of the characters used there are provided below.

Graph G:=(V,E), where V denotes a set of nodes (blocks), and E denotes a set of edges (links).

P(v):={u∈V:(u,v)∈E} (set of parent nodes for node v)
C(v):={u∈V:(v,u)∈E} (set of child nodes for node v)
|W|:=number of elements of set W
path(u,w):={u,v$_1$,v$_2$, ..., v$_{n-1}$, v$_n$,w∈V:
(u,v$_1$),(v$_1$,v$_2$), ..., (v$_{n-1}$,v$_n$)/(v$_n$,w)∈E} v≻w:∃path(v,w)

A(v):={u∈V:u≻v}

D(v):={u∈V:v≻u}

T(v):=A(v)∪{v}

$$R(v,s):=(D(v)\cup\{v\})\cap s \text{ where } s\subseteq V \qquad \text{Eq. 1}$$

||v||:=necessary time for calculation of node v (∈V)

$$\|W\| := \sum_{v\in W} \|v\| \text{ where } W \subseteq V \qquad \text{Eq. 2}$$

FIGS. 6 and 7 are flowcharts of processing in the segment extraction routine 208.

In operation 602 illustrated in FIG. 6, the segment extraction routine 208 calls S$_{ini}$:=segments(V), acquires a set of initial segments in writes the initial segments included in S$_{ini}$ as the file 210 on the hard disk drive 116, and completes the processing. Here, V indicates a set of all nodes.

FIG. 7 is a flowchart of processing in the subroutine segments(W) called in the processing in FIG. 6.

In operation 702, the subroutine segments(W) prepares an empty set of segments as S:=±Φ, collects nodes having no child nodes from W, and defines a set of the nodes as L'. That is, L' is defined as follows:

L':={v∈W:|C(v)|=0}

In operation 704, the subroutine segments (W) determines whether is an empty set. When it does not determine that is an empty set, the segments(W) selects one node v∈L' in operation 706, and extracts a set T(V) of the selected node v and its ancestral nodes and adds it as an element of S in operation 708. Here, it is to be noted that S is a set of sets of nodes and that an element of S is a set of nodes (segment). After that, in operation 710, the segments(W) remove v from L' as L':=−{v}, and then in operation 704, it determines again whether L' is an empty set. When finally becomes an empty set after repetition of the above process, the segments(W) output S as a result of processing, completes the processing, and returns to the calling source.

FIG. 8 is a flowchart of processing of subdividing initial segments into finer upstream segments and downstream segments in the segment subdivision routine 212.

In FIG. 8, in operation 802, the segment subdivision routine 212 reads a set of initial segments from the file 210 into S$_{ini}$ and sets the maximum calculation time as "a." That is, a is defined as follows:

$$a := \max_{s\in S_{ini}} \{\|s\|\} \qquad \text{Eq. 3}$$

The initial values of variables for use in subdividing the initial segments on the basis of parallelism in the initial segments are set as follows:

V':=V (set of all nodes)

r:=predefined real number, 0<r<1

X:=Φ (empty set of pivot nodes)

Then in operation 804, the segment subdivision routine 212 determines whether V'=Φ. When it does not determine that V'=Φ, it selects the node v from V' in operation 806.

Then in operation 808, the segment subdivision routine 212 calculates gain g(v) at the node v as follows:

$$g(v) := \|T(v)\| - \max_{p\in P(v)} \{\|T(p)\|\} \qquad \text{Eq. 4}$$

The value of gain g(v) is the difference between the time for calculating a segment obtained by tracing from the node v in the reverse direction of dependence and the maximum time for calculating a segment obtained by tracing from the parent node of v in the reverse direction of dependence. The value of gain g(v) represents parallelism lost by combining all blocks into one segment due to v. Conversely speaking, the value of gain g(v) representing the parallelism obtained by removal of v.

Then in operation 810, the segment subdivision routine 212 determines whether g(v)>a·r. When it determines that g(v)>a·r, it adds the node v to the set X of pivot nodes in operation 812 as X:=X∪{v}. In operation 814, it deletes the node v from V' as V':=V'−{v}, and returns to operation 804. When the segment subdivision routine 212 does not determine that g(v)>a·r in operation 810, it directly proceeds to operation 814. In operation 814, it deletes the node v from V' as V':=V'−{v}, and returns to operation 804. In operation 804, when the segment subdivision routine 212 determines that V':=Φ, it proceeds to operation 816. In operation 816, it prepares a copy $S'_{ini}$ of the set of initial segments as $S'_{ini}:=S_{ini}$ and prepares an empty set for accommodating a set $S_{down}$ of nodes to be temporarily removed from each segment and an empty set for accommodating a set $S_{up}$ of segments to be subdivided.

$$S_{down}=\Phi$$

$$S_{up}=\Phi$$

Then in operation 818, the segment subdivision routine 212 determines whether $S'_{ini}=\Phi$. When it does not determine that $S'_{ini}=\Phi$, it selects an initial segment s from $S'_{ini}$ in operation 820, and extracts, from s, a set of nodes including the selected pivot node x (∈X) and its descendant nodes as the set of nodes to be temporarily removed and recodes it in $S_{down}$ in operation 822. This processing can be described as follows:

$$R' = \bigcup_{x \in X} R(x, s) \qquad \text{Eq. 5}$$

$$S_{down} := S_{down} \cup \{R'\}$$

After that, the segment subdivision routine 212 prepares a set W' of nodes in which R' is removed from s in operation 824, and calls the above-described segments(W') in operation 826, where the upstream segments are extracted from W', and adds all segments obtained as $S_{up}:=S_{up}\cup\text{segments}(W')$ to $S_{up}$. When s includes no nodes in X (that is, X∩s=Φ), s itself is added as an element of $S_{up}$.

After that, the segment subdivision routine 212 deletes the initial segment from $S'_{ini}$ as $S'_{ini}:=S'_{ini}-\{s\}$ in operation 828, and returns to operation 818.

When the above processing on all of the initial segments is completed by repetition, $S'_{ini}$ becomes an empty set. When the segment subdivision routine 212 determines in operation 818 that $S'_{ini}=\Phi$, it writes the set $S_{up}$ of upstream segments and the set $S_{down}$ of downstream segments as the file 214 on the hard disk drive 116, and completes the processing.

Figure 9:
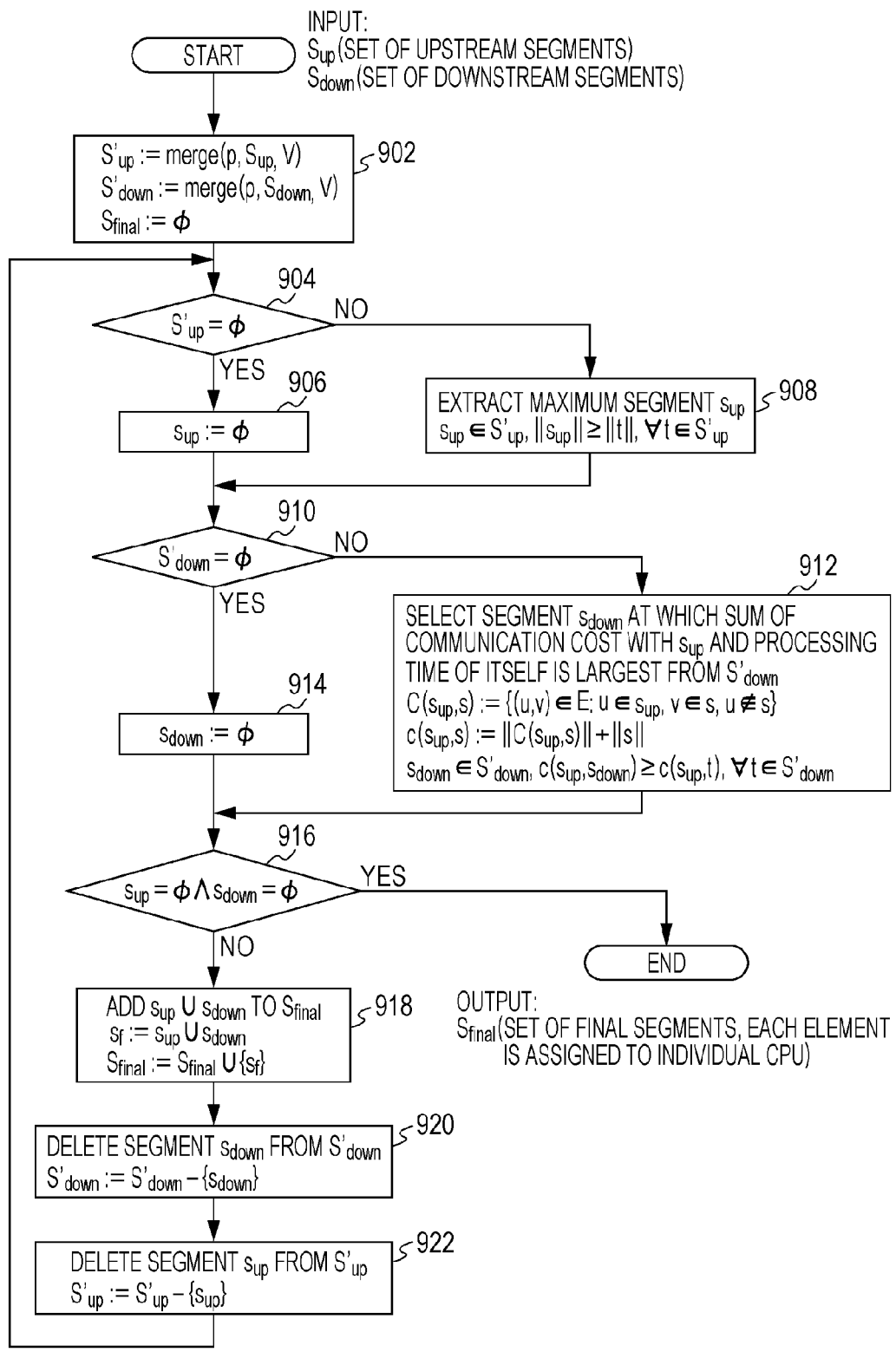
FIG. 9 is a flowchart of processing of merging upstream segments and merging downstream segments so as to reduce overlaps such that the number of the segments is reduced to the number of parallel executions, and assigning them to CPUs.
Figure 10:
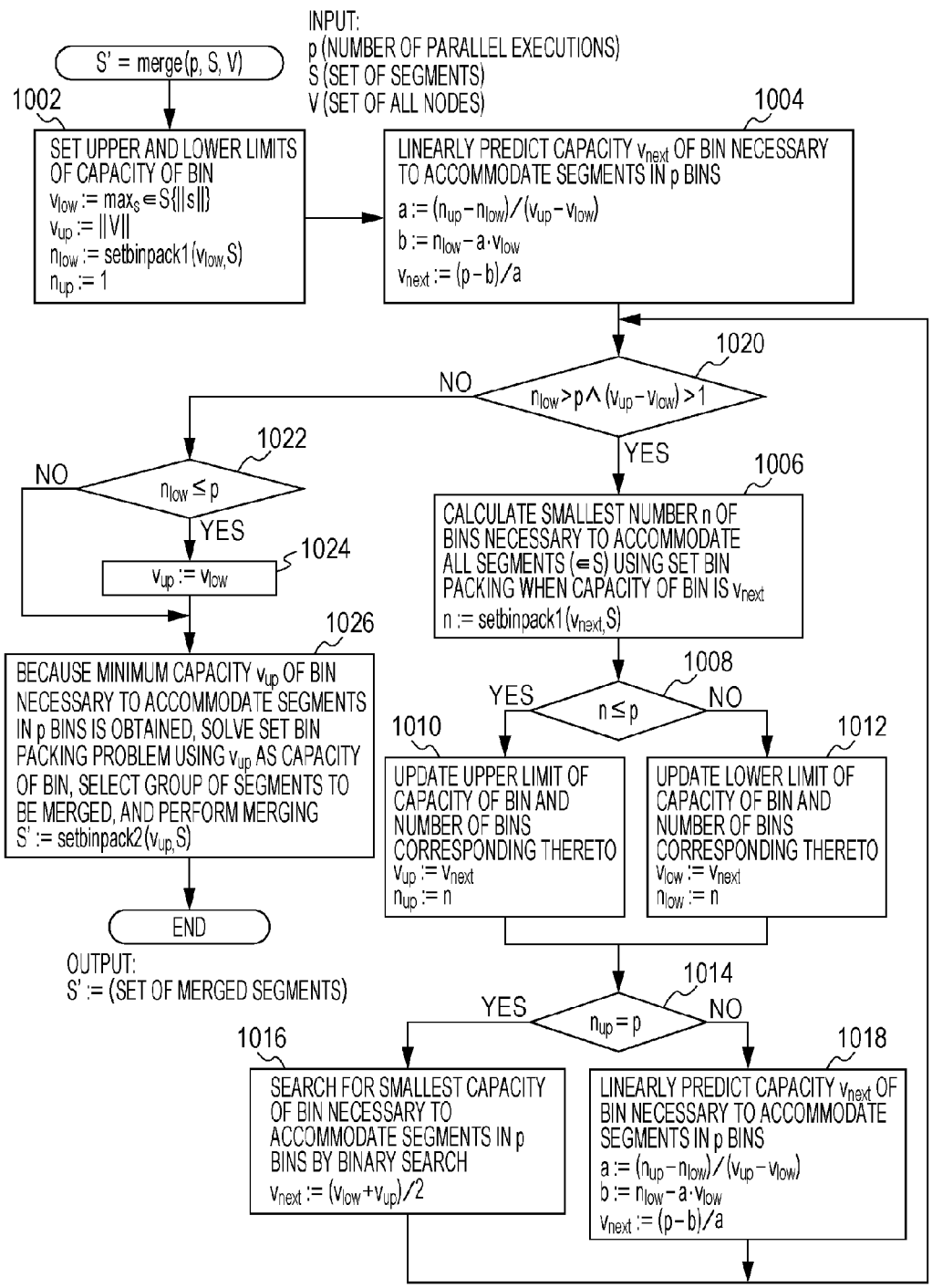
FIG. 10 is a flowchart of "merge" called in the segment merging.
Figure 11:
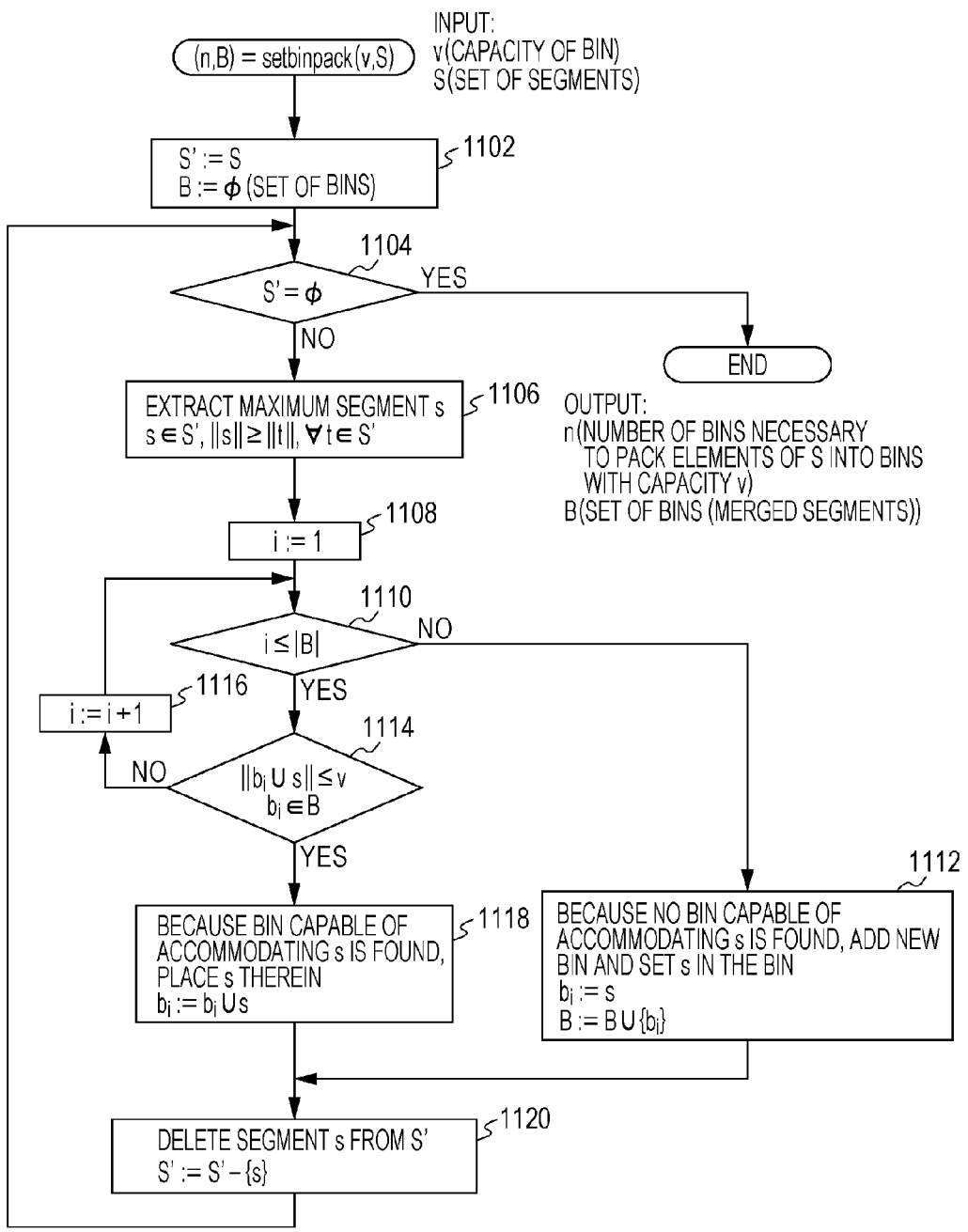
FIG. 11 is a flowchart of setbinpack called in setbinback 1 and setbinpack2.
Figure 12:
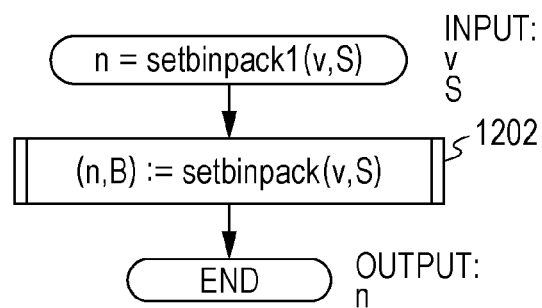
FIG. 12 is a flowchart of the setbinpack1 called in the merge.
Figure 13:
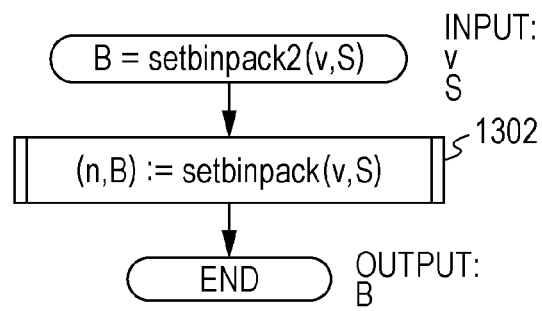
FIG. 13 is a flowchart of setbinpack2 called in the merge.

Next, processing in the merging routine 216 is described with reference to the flowcharts in FIGS. 9 to 13. FIG. 9 is a flowchart of main processing in the merging routine 216. FIG. 10 is a flowchart of "merge" called in the main processing. FIG. 12 is a flowchart of setbinpack1 called in the merge. FIG. 13 is a flowchart of setbinpack2 called in the merge. FIG. 11 is a flowchart of the setbinpack called in setbinback 1 and setbinpack2.

In operation 902 in FIG. 9, the merging routine 216 reads, from the file 214, the set of upstream segments into $S_{up}$ and the set of downstream segments into $S_{down}$, calls the merge routine illustrated in FIG. 10, and sets $S'_{up}$, $S'_{down}$, and $S_{final}$ as follows:

$$S'_{up}=\text{merge}(p, S_{up}, V)$$

$$S_{down}=\text{merge}(p, S_{down}, V)$$

$$S_{final}=\Phi$$

where p is the number of parallel executions, and V is the set of all nodes. As described below, the merge routine merges segments included in the set of segments provided in the second argument to segments whose number is p or less, and returns the result.

In operation 904, the merging routine 216 determines whether $S'_{up}=c$. When it determines that $S'_{up}=\Phi$, it sets $s_{up}=\Phi$ in operation 906. When it does not determine that $S'_{up}=\Phi$ in operation 904, it extracts the maximum segment $s_{up}$ in operation 908. That is, the extracted $s_{up}$ satisfies the following conditions.

$$s_{up} \in S'_{up}, \|s_{up}\| \geq \|t\|, \forall t \in S'_{up}$$

After operation 906 or 908, the merging routine 216 determines whether $S'_{down}=\Phi$ in operation 910. When it determines that $S'_{down}=\Phi$, it sets $s_{down}:=\Phi$ in operation 914. When it does not determine that $W'_{down}=\Phi$ in operation 910, it selects a segment $s_{down}$ at which the sum of the cost of communication with $s_{up}$ and the processing time of itself is the largest from $S'_{down}$ in operation 912 by processing represented as the expressions below.

$$C(s_{up},s) := \{(u,v) \in E : u \in s_{up}, v \in s, u \notin s\}$$

$$c(s_{up},s) := \|C(s_{up},s)\| + \|s\|$$

$$s_{down} \in S'_{down}, c(s_{up}, s_{down}) \geq c(s_{up}, t), \forall t \in S'_{down} \qquad \text{Eq. 6}$$

where $\|(u,v)\|$ is the communication cost of (u,v) and total communication cost for edges in a set can be defined as:

$$\|F\| = \sum_{(u,v) \in F} \|(u, v)\| \qquad \text{Eq. 7}$$

After operation 912 or 914, the merging routine 216 determines whether $s_{up}$ is Φ and $s_{down}$ is Φ in operation 916. When it determines that $s_{up}$ is Φ and $s_{down}$ is Φ, it writes the set $S_{final}$ of segments that are final segments whose elements are to be assigned to individual CPUs as the file 208 on the hard disk drive 116, and completes the processing.

When the merging routine 216 determines in operation 916 that at least one of $s_{up}$ and $s_{down}$ is not Φ, it creates a new union $s_f$ of $s_{up}$ and $s_{down}$ as $s_f:=s_{up}\cup s_{down}$, and adds $s_f$ to $S_{final}$ as $S_{final}:=S_{final}\cup\{s_f\}$ in operation 918.

Then the merging routine 216 deletes the segment $s_{down}$ from $S'_{down}$ as $S'_{down}:=S'_{down}-\{s_{down}\}$ in operation 920, deletes the segment $s_{up}$ from $S'_{up}$ as $S'_{up}:=S'_{up}-\{s_{up}\}$ in operation 922, and returns to operation 904.

Next, the "merge" used in operation 902 in FIG. 9 is described. The merge is processing of merging a plurality of segments to reduce them to a predetermined number of segments. At this time, a combination of segments to be merged is determined such that the times required for calculating the merged segments are balanced as much as possible (that is, the maximum calculation time is minimized), and the segments obtained in accordance with that combination are merged. To determine the combination of segments, a bin packing problem is solved repeatedly. The bin packing problem is a problem to calculate the minimal number of bins necessary for accommodating all items. Each item has a size, every bin is given a same capacity, and the sum of sizes of items packed in a bin must be equal to or smaller than the capacity of the bin. Here, each given segment is regarded as an item, the time required for calculating the segment is regarded as the size of the item, and a processor (or processor core) for executing (blocks contained in) each segment is regarded as a bin. The "merge" algorithm searches the minimum size of a bin necessary to pack every item within bins so as to the number of bins is less than or equals to the number of parallel executions. This is done by solving bin packing problem of different capacity of bins repeatedly. The solution of the bin packing problem for the minimum capacity of the bin determines the combination of segments. All segments placed in one bin are merged in one. In a typical bin packing problem, the sum of the sizes of items packed in one bin is required to be equal to or smaller than the capacity of the bin. In this case, however, because the segments share blocks, the constraint is that not the sum of the times for calculating the segments but the calculation time of the union of segments contained in one bin (this union is a set of blocks, that is, segments again because the segments are a set of blocks) is equal to or smaller than the capacity of the bin. This atypical bin packing problem having such a constraint is hereinafter referred to as set bin packing problem.

The specific details of the merge processing are described with reference to the flowchart in FIG. 10. In the following description, the time required for calculating a block is given as an integer, and the size of an item and the capacity of a bin are also given as integers. This does not cause a loss of generality. The merge has three arguments: p (number of parallel executions), s (set of segments), and V (set of all nodes).

In operation 1002, the merge sets the upper limit ($v_{up}$) and lower limit ($v_{low}$) of the capacity of a bin and corresponding numbers $n_{up}$ and $n_{low}$ of necessary bins as follows:

$$v_{low} := \max_{s \in S} \{\|s\|\} \quad \text{Eq. 8}$$

$$v_{up} := \|V\|$$

$$n_{low} := setbinpack1(v_{low}, S)$$

$$n_{up} := 1$$

The details of this setbinpack1 are described below with reference to the flowcharts in FIGS. 11 and 12. When the first argument is the capacity of the bin, the setbinpack1 returns the smallest number of bins necessary for accommodating segments provided in the second argument.

In operation 1004, the merges predicts the capacity ($v_{next}$) of the bin at which the number of bins necessary for accommodating all segments is p using the following expressions:

$$a := (n_{up} - n_{low})/(v_{up} - v_{low})$$

$$b := n_{low} - a \cdot v_{low}$$

$$v_{next} := (p - b)/a$$

Then in operation 1020, the merge determines whether $n_{low} > p$ and $(v_{up} - v_{low}) > 1$. When it determines that $n_{low} > p$ and $(v_{up} - v_{low}) > 1$, the merge proceeds to operation 1006. When it does not determine that $n_{low} > p$ and $(v_{up} - v_{low}) > 1$, the merge determines whether $n_{low}$ p in operation 1022.

When the determination is YES in operation 1022, the merge proceeds to operation 1024, where it sets $v_{up} := v_{low}$, and proceeds to operation 1026. When the determination is NO in operation 1022, the merge directly proceeds to operation 1026.

At the stage of operation 1026, the minimum capacity $v_{up}$ at which all segments can be accommodated in bins whose number is p or less is obtained. Thus the set bin packing problem is solved by using $v_{up}$ as the capacity of the bin, the combination of segments to be merged is determined, and they are merged actually. This processing is performed by calling the processing illustrated in FIG. 13 as S':=setbinpack2($v_{up}$,S).

As a result, the set S' of merged segments is obtained.

The merge returns to operation 1020. When the determination is YES in operation 1020, the merge calculates the smallest number n of bins necessary for accommodating all segments (∈S) when the capacity of the bin is $v_{next}$ using the set bin packing technique in operation 1006 by processing given by the following expression:

$$n := setbinpack1(v_{next}, S)$$

Then the merge determines whether n≤p in operation 1008. When it determines that n≤p, it updates the upper limit of the capacity of the bin and the corresponding number of bins as $v_{up} := v_{next}$, $n_{up} := n$ in operation 1010. When it does not determine that n p in operation 1008, the merge updates the lower limit of the capacity of the bin and the corresponding number of bins as $v_{low} := v_{next}$, $n_{low} := n$ in operation 1012.

Then in operation 1014, the merge determines whether $n_{up} = p$. When it determines that $n_{up} = p$, it predicts the smallest capacity $v_{next}$ of the bin necessary for accommodating the segments in p bins by binary search in operation 1016 as $v_{next} := (v_{low} + v_{up})/2$. When it does not determine that $n_{up} = p$ in operation 1014, the merge predicts the smallest capacity $v_{next}$ of the bin necessary for accommodating the segments in p bins in operation 1018 from the following expressions:

$$a := (n_{up} - n_{low})/(v_{up} - v_{low})$$

$$b := n_{low} - a \cdot v_{low}$$

$$v_{next} := (p - b)/a$$

Then the merge returns to determination in operation 1020.

Next, the setbinpack processing is described with reference to the flowchart in FIG. 11. This processing is an algorithm in which the first fit decreasing technique, which is a typical solution of the bin packing problem, is extended to a case where each item forms a set. The setbinpack has v (capacity of a bin) and S (set of segments) as arguments.

In FIG. 11, in operation 1102, the setbinpack prepares a copy of S and an empty set of bins as S':=S, B:=Φ (set of bins). Here, it is to be noted that one bin corresponds to one segment.

In operation 1104, the setbinpack determines whether S'=Φ. When it does not determine that S'=Φ, the setbinpack extracts the segment s corresponding to the maximum calculation time from S' in operation 1106. That is, s satisfies the following conditions:

$$s \in S', \|s\| \geq \|t\|, \forall t \in S'$$

By a series of operations from 1108 to 1110 to 1114 to 1116, the number i of the bin in which s is first placed is searched for in order from one. Thus in operation 1108, i:=1, which means i is set at 1, for the first time.

In operation 1110, the setbinpack determines whether i≤|B|. When it does not determine that i≤|B|, it determines that no bin capable of accommodating s is found, and it adds s itself as a new bin to B in operation 1112 as $b_i := s$, B:=B∪{$b_i$}. Then the setbinpack deletes the segment s from S' as S':=S'−{s} in operation 1120, and returns to operation 1104.

The setbinpack returns to operation 1110. When it determines that i IBI, the setbinpack continues searching for the initial bin capable of accommodating s. In operation 1114, the setbinpack determines whether ‖$b_i$∪s‖≤v($b_i$∈B), that is, whether the capacity v of the bin is not exceeded when s is placed in the i-th bin $b_i$. When the determination is NO (capacity is exceeded), the setbinpack increments i by one in operation 1116, and returns to operation 1110.

When the setbinpack determines in operation 1114 that ‖$b_i$∪s‖≤v, ($b_i$∈B), that is, s can be placed in the i-th bin $b_i$ without exceeding the capacity, it places (all elements of) s into $b_i$ as $b_i$:=$b_i$∪s. Then in operation 1120, the setbinpack deletes the segment s from S' as S':=S'−{s}, and returns to determination in operation 1104.

As is clear from FIG. 11, in the repetitive process from operation 1106 through operation 1120 to operation 1104, the segments s are serially deleted from S in operation 1120. Thus S' becomes Φ in operation 1104 somewhere in the repetition, the processing is completed, and the number n of bins with the capacity v necessary for accommodating the elements of S and the set B of merged segments obtained by placing the segments of S into the bins with the capacity v are returned.

FIG. 12 illustrates setbinpack1(v,S). As illustrated in operation 1202, the setbinpack1(v,S) calls setbinpack(v,S), and returns n.

FIG. 13 illustrates setbinpack2(v,S). As illustrated in operation 1302, the setbinpack2(v,S) calls setbinpack(v,S), and returns B.

Referring back to FIG. 9, $S_{final}$ output by processing illustrated in this flowchart is written as the merged segments 218 illustrated in FIG. 2. The merged segments 218 are converted by the code conversion routine 220 into the source code 222 of a programming language, such as C. The source code 222 is converted by the compiler 224 into the executable code 226. The executable code 226 is assigned to a plurality of CPUs and executed in parallel in the execution environment 228.

Figure 14:
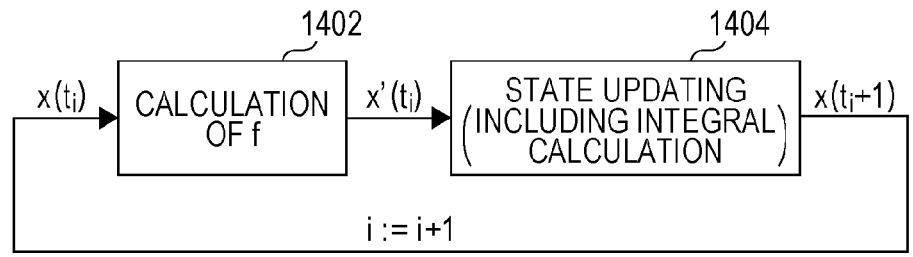
FIG. 14 is an illustration for describing how ordinary differential equations are solved by serial processing performed by a computer.

FIG. 14 schematically illustrates typical processing of numerically solving ODE/SSF. That is, ODE/SSF is assumed as follows:

$$x_1'=f_1(x(t),t)$$

$$x_2'=f_2(x(t),t)$$

$$\ldots$$

$$x_n'=f_n(x(t),t)\backslash$$

If parallelization is not performed, $f_1$, $f_2$, $f_n$ are calculated by serial processing in block 1402 in FIG. 14.

After block 1402, in block 1404, states are updated. More specifically derivative x'($t_i$) is integrated to x($t_{i+1}$), preferably, by using the Runge-Kutta method.

Figure 15:
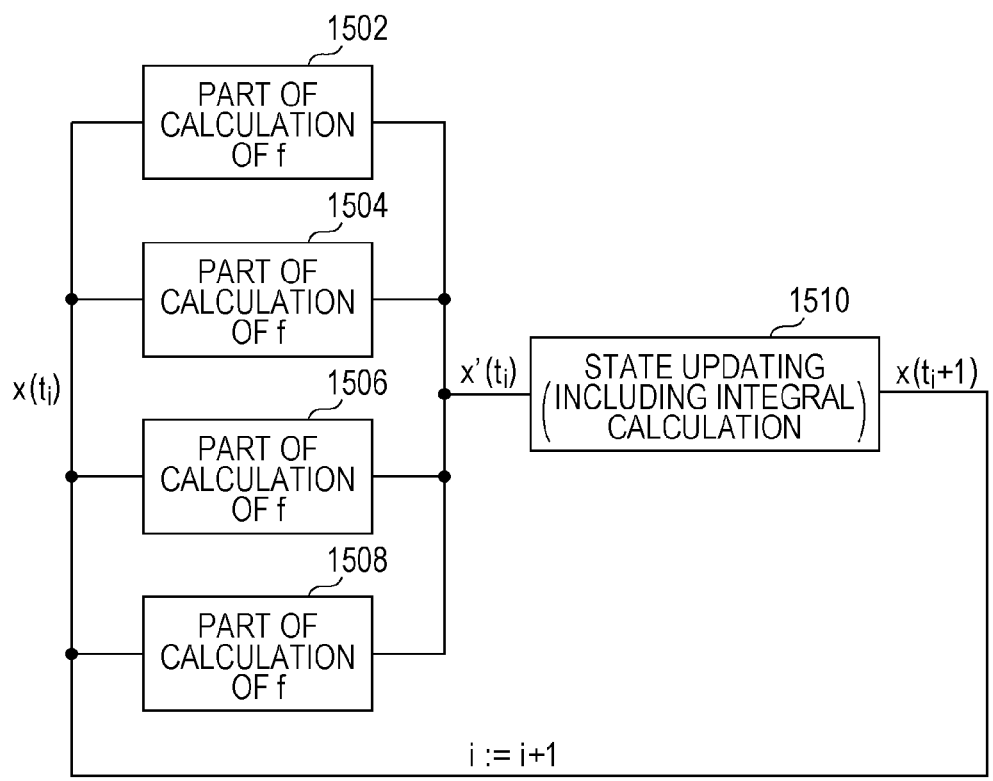
FIG. 15 is an illustration for describing how ordinary differential equations are solved by parallel processing performed by a computer.

FIG. 15 schematically illustrates processing occurring when serial calculations of $f_1$, $f_2$, ..., $f_n$ illustrated in FIG. 14 are divided into segments. In the case illustrated in FIG. 15, the calculations are assigned such that they are performed in parallel by four cores or processors. That is, in FIG. 15, the graphs of the block diagram corresponding to the serial calculations of $f_1$, $f_2$, follow the processing of the present invention, and they are divided into four segments and executed in parallel in blocks 1502, 1504, 1506, and 1508. The processing in FIG. 15 also needs state updating 1510 including integration in which the differential term x'($t_i$) is integrated to x($t_i$+1). The state updating 1510 can be executed by any CPU because, after completion of the calculations of f, none of the CPUs having calculated the blocks 1502, 1504, 1506, and 1508 are busy.

The present invention is described above on the basis of the specific embodiment. However, the present invention is not limited to this specific embodiment. It is to be understood that various modifications, configurations, and techniques, including replacements, that a person skilled in the art easily conceives can also be used. For example, the present invention is not limited to a specific processor architecture and operating system.

The above embodiment is described using MATLAB®/Simulink® as an example. It is to be understood that the present invention is not limited to this tool and is also applicable to any modeling tool.

The invention claimed is:

1. A system for solving simultaneous equations described as a plurality of ordinary differential equations represented as a graphical model including blocks as nodes and dependence as a link by processing performed by a computer including a plurality of processors, the system solving a graph representing a single ordinary differential equation using a dividing algorithm for the graph by the processing performed by the computer including the plurality of processors, the system comprising:

storing means;

a file of the model stored in the storing means;

means for forming initial segments by extracting sets of the blocks, the sets being allowed to include overlapping blocks and executable independently of each other, for each of blocks having internal states and blocks having no outputs in the model by tracing from the blocks having internal states and blocks having no outputs in a reverse direction of the dependence;

means for selecting, from the formed initial segments, a set of blocks contained in the initial segments on the basis of parallelism in the initial segments;

means for extracting sets of the blocks, the sets being allowed to include overlapping blocks and executable independently of each other, for each of blocks whose child blocks are lost by removal of the selected set of blocks from a processing target by tracing from the blocks whose child blocks are lost in the reverse direction of the dependence;

merge means for, when the extracted segments and the segment whose internal blocks are not removed from the processing target among the initial segments are referred to as upstream segments and the sets of blocks selected and removed from the processing target are referred to as downstream segments, merging the upstream segments and merging the downstream segments so as to reduce overlapping such that a number of the upstream segments and the downstream segments is reduced to at or below a predetermined number of parallel executions;

means for compiling each of the merged segments and converting it into executable code; and means for individually assigning the executable code for the segments to the plurality of processors and causing the plurality of processors to execute their respective executable code in parallel.

2. The system according to claim 1, wherein the means for forming the initial segments performs tracing each of parent blocks and adding the block to the segment so as to exclude a parent block having dependence capable of being considered to be nonexistent in one time step, such as an input into the blocks having internal states.

3. The system according to claim 1, wherein the means for selecting the set of blocks contained in the initial segments includes means for selecting the set of blocks when a gain at the node is larger than a predetermined value.

4. The system according to claim 1, wherein the merge means performs repeatedly solving a bin packing problem.

5. The system according to claim 1, wherein the blocks having internal states are blocks for integral calculation or user-defined blocks.

6. The system according to claim 1, wherein the computer including the plurality of processors include a multi-core processor.

* * * * *